United States Patent
Yellin et al.

(10) Patent No.: US 9,723,470 B1
(45) Date of Patent: Aug. 1, 2017

(54) SELECTIVE ENABLING OF DATA SERVICES TO ROAMING WIRELESS TERMINALS

(71) Applicant: Tensera Networks Ltd., Adanim (IL)

(72) Inventors: Daniel Yellin, Raanana (IL); David Ben Eli, Modiin (IL); Shimon Moshavi, Beit Shemesh (IL); Navot Goren, Kibutz Ramot Menashe (IL)

(73) Assignee: TENSERA NETWORKS LTD., Adanim (IL)

( * ) Notice: Subject to any disclaimer, the term of this patent is extended or adjusted under 35 U.S.C. 154(b) by 0 days.

(21) Appl. No.: 15/092,638

(22) Filed: Apr. 7, 2016

Related U.S. Application Data

(60) Provisional application No. 62/154,823, filed on Apr. 30, 2015, provisional application No. 62/274,319, filed on Jan. 3, 2016, provisional application No. 62/293,343, filed on Feb. 10, 2016.

(51) Int. Cl.
*H04M 11/00* (2006.01)
*H04W 4/26* (2009.01)
*H04L 29/08* (2006.01)
*H04W 4/02* (2009.01)

(52) U.S. Cl.
CPC .......... *H04W 4/26* (2013.01); *H04L 67/2847* (2013.01); *H04W 4/02* (2013.01)

(58) Field of Classification Search
CPC ........ H04W 4/26; H04W 4/02; H04L 67/2847
See application file for complete search history.

(56) References Cited

U.S. PATENT DOCUMENTS

| | | |
|---|---|---|
| 8,089,892 B2 | 1/2012 | Liu et al. |
| 8,341,245 B1 | 12/2012 | Roskind et al. |
| 8,447,837 B2 | 5/2013 | Devanneaux et al. |
| 8,566,867 B1 | 10/2013 | Yang et al. |
| 8,601,052 B2 | 12/2013 | Mir et al. |
| 8,625,667 B2 | 1/2014 | Cilli et al. |
| 8,635,339 B2 | 1/2014 | Luna |
| 8,655,404 B1 | 2/2014 | Singh et al. |
| 8,826,102 B2 | 9/2014 | Liu et al. |
| 8,849,731 B2 | 9/2014 | Lymberopoulos et al. |
| 8,886,176 B2 | 11/2014 | Luna et al. |
| 8,949,420 B2 | 2/2015 | Banavar et al. |

(Continued)

OTHER PUBLICATIONS

International Application # PCT/IB2015/052873 Search Report dated Aug. 12, 2015.

(Continued)

*Primary Examiner* — Ajit Patel
(74) *Attorney, Agent, or Firm* — D. Kligler IP Services Ltd.

(57) ABSTRACT

A system includes a network interface and one or more processors. The processors are configured to track a first pattern with which a user terminal consumes one or more data services while served by a home network specified for the user terminal, to track a second pattern with which the user terminal consumes the one or more data services while served by one or more networks other than the home network, to estimate a reduction in usage of the one or more data services between the first and second patterns, and to selectively enable at least one data service to the user terminal by the networks other than the home network, based on the estimated reduction in usage.

26 Claims, 2 Drawing Sheets

(56) References Cited

U.S. PATENT DOCUMENTS

| | | | |
|---|---|---|---|
| 9,043,433 B2 | 5/2015 | Backholm | |
| 9,049,179 B2 | 6/2015 | Luna | |
| 9,111,309 B2 | 8/2015 | Howard et al. | |
| 9,118,623 B2 | 8/2015 | Devanneaux et al. | |
| 9,208,123 B2 | 12/2015 | Luna | |
| 9,247,019 B2 | 1/2016 | Luna et al. | |
| 9,256,484 B2 | 2/2016 | Stanley-Marbell et al. | |
| 9,307,007 B2 | 4/2016 | Kapadia et al. | |
| 9,392,393 B2 | 7/2016 | Wood et al. | |
| 9,407,713 B2 | 8/2016 | Luna et al. | |
| 9,557,889 B2 * | 1/2017 | Raleigh | G06F 3/0482 |
| 2002/0198991 A1 | 12/2002 | Gopalakrishnan et al. | |
| 2005/0198191 A1 | 9/2005 | Carlson et al. | |
| 2006/0056336 A1 | 3/2006 | Dacosta | |
| 2006/0135160 A1 * | 6/2006 | Jiang | H04W 8/04 455/435.1 |
| 2009/0292819 A1 | 11/2009 | Kandekar et al. | |
| 2010/0161831 A1 | 6/2010 | Haas et al. | |
| 2010/0188975 A1 * | 7/2010 | Raleigh | G06Q 10/06375 370/230.1 |
| 2011/0230164 A1 * | 9/2011 | Ophir | H04M 15/00 455/406 |
| 2012/0023226 A1 | 1/2012 | Petersen et al. | |
| 2012/0072671 A1 | 3/2012 | Chirca et al. | |
| 2012/0289147 A1 | 11/2012 | Raleigh et al. | |
| 2013/0196615 A1 * | 8/2013 | Zalmanovitch | H04W 24/02 455/405 |
| 2013/0263180 A1 | 10/2013 | Yang et al. | |
| 2013/0290557 A1 | 10/2013 | Baratz | |
| 2013/0343450 A1 | 12/2013 | Solka et al. | |
| 2014/0032718 A1 | 1/2014 | Berger et al. | |
| 2014/0059156 A1 | 2/2014 | Freeman, II et al. | |
| 2014/0094163 A1 | 4/2014 | Widdowson et al. | |
| 2014/0150019 A1 | 5/2014 | Ma et al. | |
| 2014/0219088 A1 | 8/2014 | Oyman et al. | |
| 2014/0279026 A1 | 9/2014 | Nath et al. | |
| 2014/0362768 A1 | 12/2014 | Wood et al. | |
| 2014/0364104 A1 | 12/2014 | Wood et al. | |
| 2014/0366041 A1 | 12/2014 | Stanley-Marbell et al. | |
| 2014/0366042 A1 | 12/2014 | Chan et al. | |
| 2014/0372511 A1 | 12/2014 | Kapadia et al. | |
| 2014/0373032 A1 | 12/2014 | Merry et al. | |
| 2014/0379840 A1 | 12/2014 | Dao | |
| 2015/0120821 A1 | 4/2015 | Bendell et al. | |
| 2015/0241941 A1 | 8/2015 | Luna et al. | |
| 2015/0256641 A1 | 9/2015 | Agarwal et al. | |
| 2015/0296505 A1 | 10/2015 | Luna et al. | |
| 2015/0347204 A1 | 12/2015 | Stanley-Marbell et al. | |
| 2015/0347205 A1 | 12/2015 | Stanley-Marbell et al. | |
| 2015/0347907 A1 | 12/2015 | Mathew et al. | |
| 2015/0347908 A1 | 12/2015 | Mathew et al. | |
| 2015/0350807 A1 | 12/2015 | Andrews et al. | |
| 2015/0350885 A1 | 12/2015 | Stanley-Marbell et al. | |
| 2015/0351033 A1 | 12/2015 | Stanley-Marbell et al. | |
| 2015/0365904 A1 | 12/2015 | Luna et al. | |
| 2016/0021211 A1 | 1/2016 | Yellin et al. | |
| 2016/0063577 A1 | 3/2016 | Yellin et al. | |
| 2016/0065662 A1 | 3/2016 | Yellin et al. | |
| 2016/0191651 A1 | 6/2016 | Balakrishnan et al. | |
| 2016/0191664 A1 | 6/2016 | Balakrishnan et al. | |
| 2016/0205028 A1 | 7/2016 | Luna et al. | |

OTHER PUBLICATIONS

International Application # PCT/IB2015/057698 Search Report dated Feb. 11, 2016.

Apple Inc., "Example Playlist Files for use with HTTP Live Streaming", iOS Developer Library, Technical Note TN2288, 16 pages, May 9, 2012.

Yellin et al., PCT/IB2015/057698 Application dated Oct. 8, 2015.

Pantos et al., "HTTP Live Streaming draft-pantos-http-live-streaming-13", Internet-Draft, 56 pages, Apr. 16, 2014.

Apple Inc., "HTTP Live Streaming Overview—Introduction", Mac Developer Library, 3 pages, Feb. 11, 2014.

Yan et al., "Fast App Launching for Mobile Devices Using Predictive User Context", MobiSys 12, 14 pages, Jun. 25-29, 2012.

Andtaus et al., "File Prefetching for Mobile Devices Using On-Line Learning", 10 pages, Aug. 2008.

* cited by examiner

SELECTIVE ENABLING OF DATA SERVICES TO ROAMING WIRELESS TERMINALS

CROSS-REFERENCE TO RELATED APPLICATIONS

This application claims the benefit of U.S. Provisional Patent Application 62/154,823, filed Apr. 30, 2015, U.S. Provisional Patent Application 62/274,319, filed Jan. 3, 2016, and U.S. Provisional Patent Application 62/293,343, filed Feb. 10, 2016. The disclosures of all these related applications are incorporated herein by reference.

FIELD OF THE INVENTION

The present invention relates generally to wireless communication, and particularly to methods and systems for selective enabling of data services to roaming wireless terminals.

BACKGROUND OF THE INVENTION

Various techniques are known in the art for delivering content and providing various data services to wireless users. For example, U.S. Pat. No. 8,601,052, whose disclosure is incorporated herein by reference, describes a method and system for performing content prefetching for a wireless portable computing device (PCD).

As another example, U.S. Patent Application Publication 2010/0161831, whose disclosure is incorporated herein by reference, describes a content and traffic managing system. A mobile device is connectable to users and to content providers via communication links. The system tracks various parameters over time, and schedules communication in relation to predefined or projected content responsive to user content-related behavior, user communication behavior, user external behavior, and parameters of communication links.

U.S. Pat. No. 9,009,103, whose disclosure is incorporated herein by reference, describes techniques for fingerprint-based content prefetching. An example apparatus has a memory configured to store content items or fingerprints derived from content items. The apparatus includes a set of logics that are configured to selectively asynchronously provide a content item or a fingerprint derived from the content item to a data store on a mobile computing device. The apparatus may be configured to select the content item based on a proactive, crowd-sourced, predictive and adaptive method. The apparatus may consider the state (e.g., available memory, available battery and available communication channels) of the mobile device before providing content.

U.S. Patent Application Publication 2011/0029670, whose disclosure is incorporated herein by reference, describes techniques for correlating user activity and location-based prediction of network access events with the delivery of pushed content to a computing device. Location information for the computing device is received by the computing device. One or more network access events are predicted, or network access characteristics are determined, based on the location information and user activity on the computing device. The computing device adjusts delivery or receipt of the pushed content based on the predicted network access events or the determined network access characteristics. For example, data is prefetched prior to occurrence of the predicted network access events, or data retrieval requests are postponed until after the occurrence of the predicted network access events.

U.S. Patent Application Publication 2010/0088369, whose disclosure is incorporated herein by reference, describes techniques for determining whether to abort a prefetch operation. Embodiments include accumulator functionality for accumulating object data prior to making an abort determination. Certain embodiments compress the accumulated data to more accurately reflect the cost of pushing the data to the client as part of the prefetch operation.

U.S. Patent Application Publication 2003/0126232, whose disclosure is incorporated herein by reference, describes a computer system that uses a prefetch prediction model having energy usage parameters to predict the impact of prefetching specified files on the system's energy usage.

SUMMARY OF THE INVENTION

An embodiment of the present invention that is described herein provides a system including a network interface and one or more processors. The processors are configured to track a first pattern with which a user terminal consumes one or more data services while served by a home network specified for the user terminal, to track a second pattern with which the user terminal consumes the one or more data services while served by one or more networks other than the home network, to estimate a reduction in usage of the one or more data services between the first and second patterns, and to selectively enable at least one data service to the user terminal by the networks other than the home network, based on the estimated reduction in usage.

In some embodiments, the processors are configured to track the first and second patterns and estimate the reduction in usage with respect to one or more active data services, and to selectively enable one or more passive data services. In an embodiment, the processors are configured to selectively enable prefetching of content to the user terminal.

In an embodiment, the processors are configured to permit exchange of up to a first data volume in response to a first reduction in usage, and to permit exchange of up to a second data volume, larger than the first data volume, in response to a second reduction in usage that is smaller than the first reduction in usage. Additionally or alternatively the processors are configured to deny the data service in response to a first reduction in usage, and to permit the data service in response to a second reduction in usage that is smaller than the first reduction in usage.

In a disclosed embodiment, the processors are configured to track the first and second patterns by tracking one or more of: first and second time durations spent in consuming the data services on the home network and on the networks other than the home network, respectively; first and second data volumes exchanged in consuming the data services on the home network and on the networks other than the home network, respectively; and first and second data volumes exchanged in consuming the data services on the home network and on the networks other than the home network, normalized by first and second registration durations on the home network and on the networks other than the home network, respectively.

In some embodiments, the processors are configured to selectively enable the data service by: deriving, from the estimated reduction in usage, an extra cost of consuming the one or more data services by the user terminal when served by the networks other than the home network, relative to the home network; and selectively enabling the data service depending on the extra cost.

In an example embodiment, the processors are configured to assess the extra cost as a function of a geographical location of the user terminal. In another embodiment, the processors are configured to derive the extra cost for a given roaming network by assessing, over a plurality of other user terminals having the same home network as the user terminal, a prevalence of consuming the data service on the given roaming network. In yet another embodiment, the processors are configured to adjust an estimate of the extra cost based on a target ratio between usage of prefetched data and usage of non-prefetched data.

In an embodiment, the processors are configured to set, based on the reduction in usage, a target ratio between usage of prefetched data and usage of non-prefetched data. In a disclosed embodiment, the processors are configured to selectively enable the data service based on an assessed level of importance of the data service to a user of the user terminal when roaming. In some embodiments, the processors are configured to estimate the reduction in usage, and selectively enable the data service, separately for first and second networks other than the home network.

There is additionally provided, in accordance with an embodiment of the present invention, a method including tracking a first pattern with which a user terminal consumes one or more data services while served by a home network specified for the user terminal. A second pattern, with which the user terminal consumes the data services while served by one or more networks other than the home network, is also tracked. A reduction in usage of the one or more data services between the first and second patterns is estimated. At least one data service is selectively enabled to the user terminal by the networks other than the home network, based on the estimated reduction in usage.

The present invention will be more fully understood from the following detailed description of the embodiments thereof, taken together with the drawings in which:

DETAILED DESCRIPTION OF EMBODIMENTS

Overview

Figure 1:
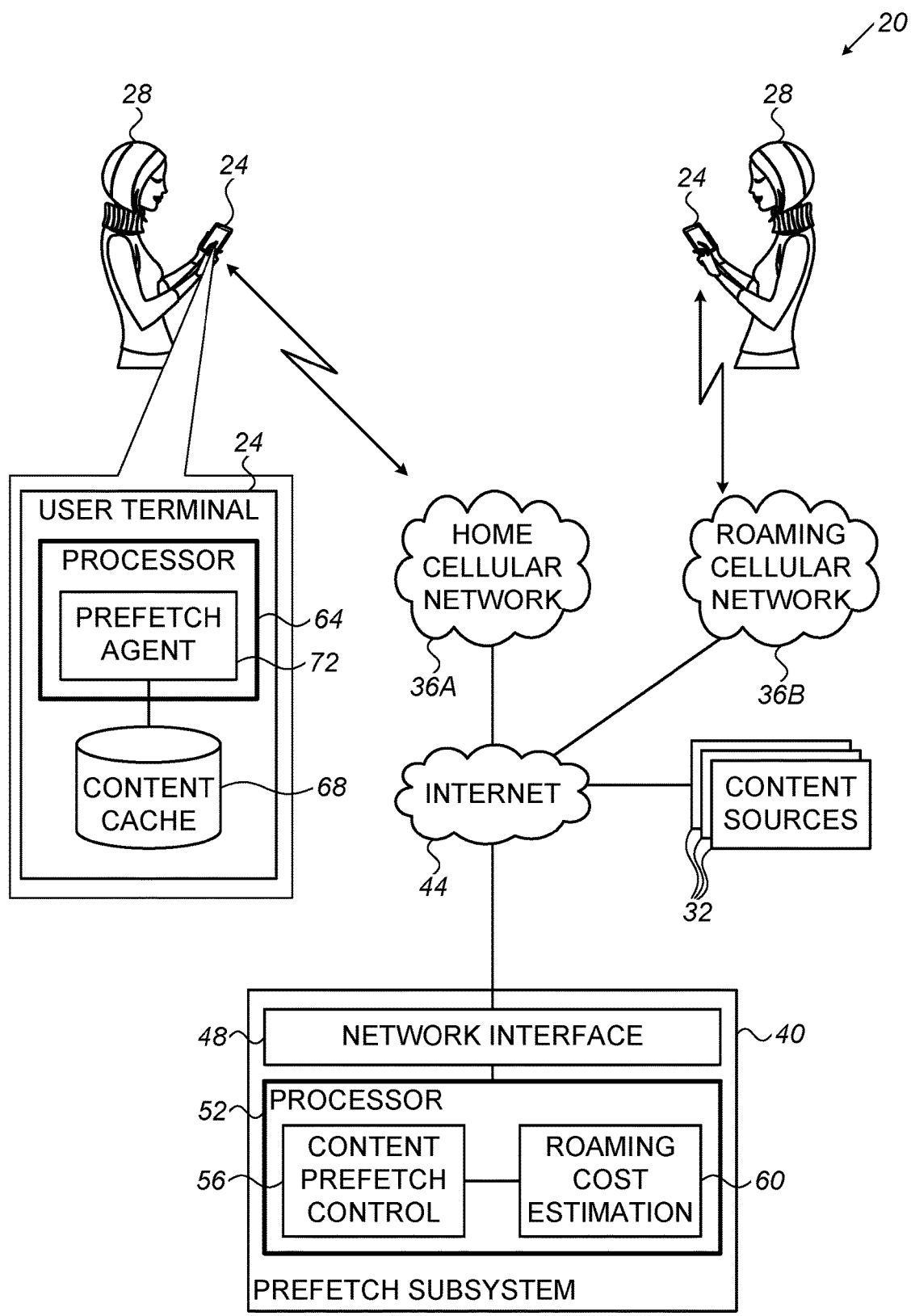
FIG. 1 is a block diagram that schematically illustrates a content delivery system, in accordance with an embodiment of the present invention.

User terminals, such as smartphones, often have a specified home network but may also be served by other networks. In the context of the present patent application and in the claims, a user terminal served by a network other than its home network is referred to as roaming, and the network is referred to as a roaming network. A user terminal served by its home network is referred to as non-roaming, and the home network is referred to as a non-roaming network. A given network may thus function as a roaming network for some terminals, and as a non-roaming network for other terminals.

In many cases, consuming data services on a roaming network is considerably more expensive than on a non-roaming network. There exist, however, various scenarios in which the cost of data services when roaming and non-roaming is similar. For example, a user's home cellular service provider may be a Mobile Virtual Network Operator (MVNO). Since the MVNO often operates over network infrastructure belonging to some other cellular operator, the user may appear to be in roaming when being served by the other operator network infrastructure. In the present context, a terminal served by its home service provider over the home service provider's network infrastructure is regarded as served by the home network. A terminal served by its home service provider over the network infrastructure of another service provider is considered not being served by the home network.

As another example, the operator of the roaming network may have a roaming agreement with the operator of the terminal's home network, resulting in attractive roaming costs. In yet other cases, a specific user may be agnostic or insensitive to the higher cost of roaming.

Embodiments of the present invention that are described herein provide improved methods and systems for providing data services to user terminals served by roaming networks. The disclosed techniques enable data services selectively to a roaming user terminal, e.g., decide whether, to what extent, and/or which services to enable or deny to a specific terminal. In the disclosed embodiments, these decisions are based not only on whether the terminal is roaming or not, but also on the expected impact of the cost of roaming on the user. The disclosed techniques typically assess, based on past content-consumption activity of the terminal, whether or not the user is tolerant to the added cost of data services while roaming.

The disclosed techniques are typically applied to passive, background data services, such as prefetching, which are not explicitly requested or invoked by the user. Active data services, and user activities relating to data services, such as Web browsing, are typically excluded from the disclosed techniques. Data services that the terminal performs in the background, but may be enabled or disabled by the user, such as prefetching, are still regarded herein as background data services.

In some embodiments, a processor in the user terminal or in an external system tracks the pattern with which the terminal consumes one or more data services. The processor tracks two patterns, a "roaming pattern" that is indicative of how the terminal consumes data services while served by a roaming network, and a "non-roaming pattern" that is indicative of how the terminal consumes data services while served by its home network.

The processor assesses a measure of reduction in data usage between the non-roaming and roaming patterns, and selectively enables a data service to the terminal when roaming, based on the measure of reduction. If the comparison between the roaming and non-roaming patterns indicates that the user reduces his usage of data services while roaming, the processor reduces the extent of enabling data services. Otherwise, i.e., if the comparison shows that data usage is similar or greater while roaming, the processor does not reduce the extent of enabling data services.

In the context of the present patent application and in the claims, the term "selectively enabling data services" refers to any kind of decision or policy that enables data services conditionally. Selective enabling may involve limiting the volume of data to be consumed, enabling only one or more selected data services and denying other data services, or simply enabling unlimited use of data services or denying data services altogether. Enabling of data, whether complete or partial, may be performed indiscriminately for all data traffic of the terminal, or per application. For example, selective enabling may comprise disabling data for one application running in the terminal, while at the same time enabling data for another application.

In some embodiments, the measure of reduction in data usage is translated directly into a policy of selective provisioning of data service. In other embodiments, the measure of reduction is first used for estimating the extra roaming cost, and the cost estimate is then translated into a selective service-provisioning policy.

The rationale behind the disclosed techniques is that little or no reduction in data usage between the non-roaming and roaming patterns is indicative of a user who is willing to accept the higher cost of roaming (or indicates that the actual extra cost is small). A user who consumes less content when roaming, on the other hand, is assumed to be sensitive to the extra cost.

Since the estimate of the extra roaming cost is derived from the actual usage patterns of the user, the estimate is indicative of the subjective perception of the particular user as to the cost of roaming. For example, for the same actual costs of roaming vs. non-roaming data services, the usage patterns of one user may indicate more cost consciousness and less tolerance to the extra cost of roaming, while the usage patterns of another user may indicate less cost consciousness and more tolerance to pay the extra cost. The disclosed techniques will enable roaming data services differently for these different users, so as to match the preferences of each user.

The embodiments described herein provide several example techniques for estimating the roaming and non-roaming content-consumption patterns, for estimating the impact of the cost of roaming on the user, and for selectively enabling data services. Several example techniques for detecting whether a terminal is currently roaming are also described.

The disclosed techniques are highly effective in matching the provisioning of data services to the characteristics and preferences of the user, in terms of cost and user experience. The embodiments described herein refer mainly to content prefetching, as an example of a data service that can be enabled selectively. The disclosed techniques, however, can be used with any other suitable data service.

System Description

FIG. 1 is a block diagram that schematically illustrates a content delivery system 20, in accordance with an embodiment of the present invention. System 20 comprises user terminals 24 operated by users 28, which access and consume content provided by one or more content sources 32.

Terminals 24 may comprise any suitable type of wireless terminal, such as, for example, cellular phones or smartphones, wireless-enabled laptops or tablet computers, or any other suitable type of user terminal that is capable of communicating over a network and presenting content to a user. A user terminal 24 may consume content using any suitable software, e.g., a browser or dedicated application.

Content sources 32 may comprise, for example, Web content servers, or any other suitable sources of content. The content being consumed may comprise, for example, Web pages, video or audio clips, and/or various types of files, to name just a few examples. FIG. 1 shows a single terminal 24 for the sake of clarity, but real-life systems typically comprise a large number of user terminals of various kinds.

The example of FIG. 1 shows a particular terminal 24 of a particular user 28, at different times. At certain times, terminal 24 is served by a cellular network 36A, which is defined as the home network (also referred to as a non-roaming network) of this terminal. The identity of the home network is typically predefined in the Subscriber Identity Module (SIM) of the terminal. At other times, the same terminal 24 is served by a different cellular network 36B, which acts as a roaming network for this terminal.

In this embodiment, content sources 32 are accessible to terminal 24 regardless of whether it is served by home network 36A or by roaming network 36B. For example, networks 36A and 36B are both connected to the Internet 44, and so are content sources 32. Alternatively, any other system connectivity and configuration can also be used.

In some embodiments, system 20 performs prefetching of content using methods that are described in detail below. In the present example, user terminal 24 comprises a processor 64 that carries out the various processing tasks of the terminal. Among other tasks, processor 64 runs a software component referred to as a prefetching agent 72, which handles prefetching of content. User terminal 24 further comprises a content cache 68 for caching prefetched content items. Cache 68 is typically managed by agent 72. User terminal 24 typically also comprises a suitable network interface (not shown in the figure) for connecting to cellular networks such as networks 36A and 36B. This network interface may comprise, for example, a cellular modem.

In the embodiment of FIG. 1, system 20 further comprises a prefetching subsystem 40 that performs the various content prefetching tasks on the network side. Subsystem 40 comprises a network interface 48 for connecting to the Internet, and a processor 52 that carries out the various processing tasks of the prefetching subsystem. In the present example, processor 52 runs a Content Prefetching Control unit (CPC) 56 and a Roaming Cost Estimation unit (RCE) 60. The roles of these units is described in detail below. Generally, RCE 60 estimates the relative extra cost of consuming data services by terminal on the roaming network, relative to the non-roaming network. This information is used by CPC 56 to better define and enforce a prefetching policy for terminal 24.

Certain aspects of content prefetching, and content prefetching schemes that can be used by subsystem 40 and agent 72, are addressed in U.S. Patent Application Publication 2016/0021211, which is assigned to the assignee of the present patent application and whose disclosure is incorporated herein by reference.

The configurations of system 20 and its various elements shown in FIG. 1, e.g., terminal 24 and subsystem 40, are example configurations that are chosen purely for the sake of conceptual clarity. In alternative embodiments, any other suitable configurations can be used. For example, the functions of prefetching subsystem 40 can be implemented using any desired number of processors, or even in a single processor. The various system functions can be partitioned among the processors in any suitable way. In another embodiment, some or all of the functions of subsystem 40 may be performed by agent 72 in user terminal 24. Examples of such configurations are described in greater detail below. Thus, in the context of the present patent application and in the claims, the disclosed techniques are carried out by one or more processors. The processors may reside in user terminal 24, and/or on the network side such as in subsystem 40, in content sources 32, or elsewhere.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 68 may be implemented using one or more memory or storage devices of any suitable type. In some embodiments, agent 72 and/or subsystem 40 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Selective Enabling of Prefetching to Roaming User Terminals

In some embodiments, system 20 enables prefetching of content selectively to terminals 24 when roaming. Prefetching typically involves predicting which content items user 28 is likely to access in the future, and fetching these content items from content sources 32 to content cache 68 before the user actually accesses them. While improving user experience, prefetching does cause some extra data transfer over the network, e.g., because some prefetched content items may not eventually be accessed by the user. Thus, prefetching is an example of a data service that may incur extra cost when roaming. This extra cost may or may not be tolerated by user 28.

Referring to the example of FIG. 1, when terminal 24 is served by home network 36A, system 20 may permit prefetching without limitation, since the cost of data services on the home network are expected to be low. On the other hand, when terminal 24 is served by roaming network 36B, system 20 may decide to limit the extent of prefetching, or disable prefetching altogether for all applications or for selected applications, to avoid excessive cost.

System 20 typically decides whether and how to selectively enable prefetching adaptively, based on the reduction in data-service usage between non-roaming and roaming. Typically, system 20 distinguishes between passive, background data services and active data services. Passive data services are not interactive and not explicitly invoked by the user. Prefetching is one example of a passive data service. Active data services are typically interactive with the user, or at least explicitly invoked by the user. Web browsing is one example of an active data services.

Typically, system 20 estimates the roaming and non-roaming patterns based on active data services, and not based on passive data services. The rationale is that the extent of usage of active data services is indicative of the user preferences and sensitivity to extra roaming cost. The amount of usage of passive data services is typically transparent to the user, and does not contribute meaningful information to the roaming and non-roaming patterns.

Selective enabling of data services, on the other hand, is typically applied by system 20 to passive data service and not to active data services. In one example embodiment, system 20 may estimate the roaming and non-roaming usage patterns based on the Web-browsing activity of the user, and use these patterns for selectively enabling prefetching.

The description that follows refers to a specific partitioning of functions between prefetching agent 72 (running on processor 64 of terminal 24), CPC 56 and RCE 60 (both running on processor 52 of prefetch subsystem 40). In alternative embodiments, these functions may be partitioned among the various processors in any other suitable way.

In one alternative embodiment, the disclosed techniques (e.g., tracking the roaming and non-roaming patterns, estimating the extra cost of data services on the roaming network, and selectively enabling data services) are carried out exclusively on the network side, by subsystem 40, without a need to run an agent such as agent or any other software on terminal 24. In another alternative embodiment, the disclosed techniques (e.g., tracking the roaming and non-roaming patterns, estimating the extra cost of data services on the roaming network, and selectively enabling data services) are carried out exclusively on the terminal side, e.g., by agent 72, without a need for any external system such as subsystem 40.

In the present embodiment, RCE 60 in prefetch subsystem 40, and/or prefetch agent 72 in terminal 24, tracks and estimates the patterns with which user terminal 24 uses data services when roaming and when non-roaming. CPC 56 enables prefetching for the user terminal selectively, depending on the level of reduction in data-service usage between the non-roaming and roaming patterns.

Figures 2, 3:
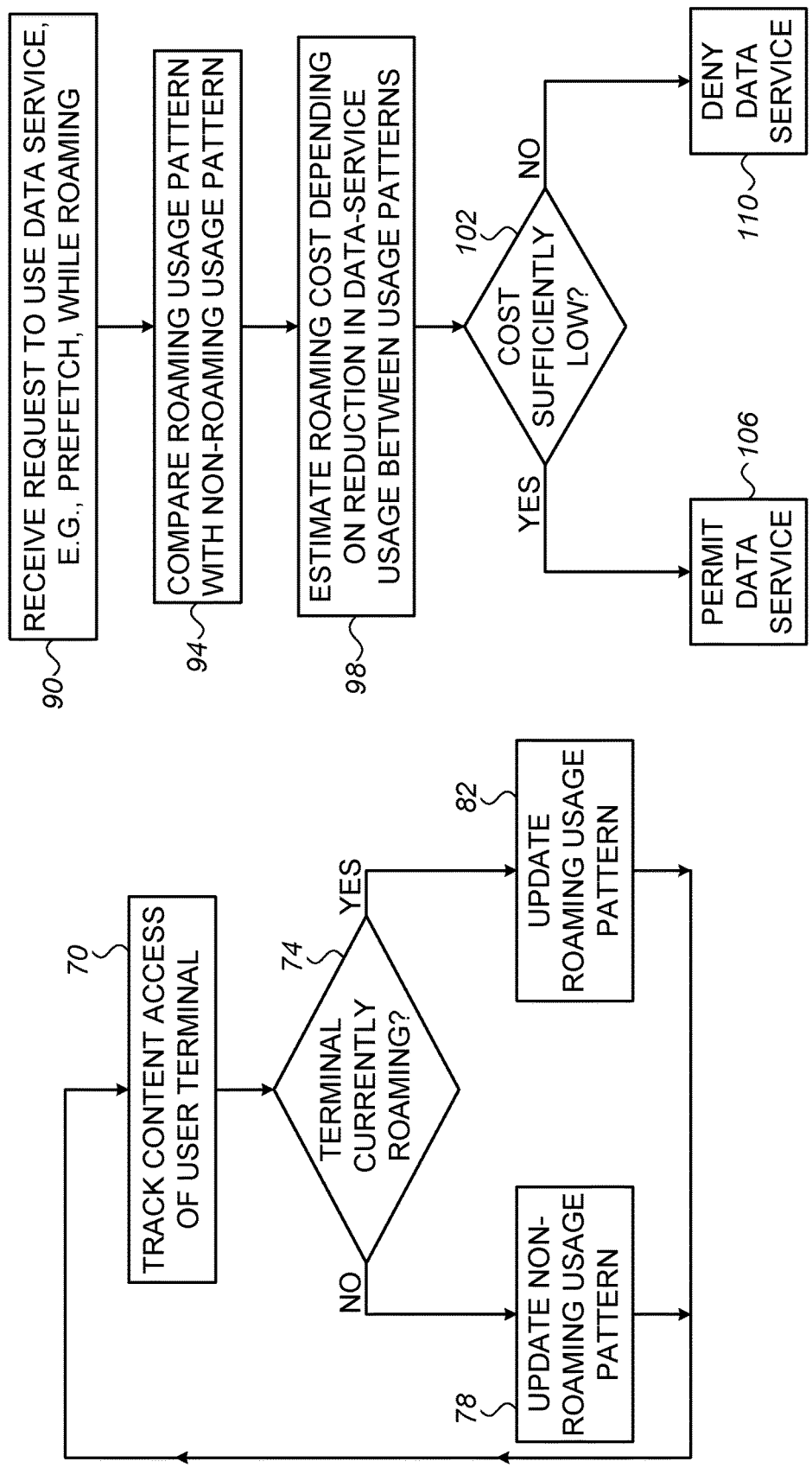
FIG. 2 is a flow chart that schematically illustrates a method for estimating roaming and non-roaming usage patterns of a user terminal, in accordance with an embodiment of the present invention.
FIG. 3 is a flow chart that schematically illustrates a method for selective enabling of data services to a user terminal, in accordance with an embodiment of the present invention.

FIG. 2 is a flow chart that schematically illustrates a method for estimating roaming and non-roaming patterns of usage of data services by user terminal 24, in accordance with an embodiment of the present invention. The method begins with RCE 60 and/or agent 72 tracking the usage of data services (typically active services such as Web browsing) by terminal 24, at a usage tracking step 70.

At a roaming detection step 74, agent 72 checks whether or not terminal 24 is currently roaming. Agent 72 may use various techniques for detecting whether terminal 24 is roaming or not at a particular point in time. For example, the Android operating system provides access to an Application Programming Interface (API) indicator called isRoaming( ) that indicates explicitly whether the terminal is roaming or not.

In other embodiments, such as when using iOS, the operating system does not provide an explicit roaming indication. In such embodiments, agent 72 may compare the identity of the home network (as stored on the SIM) with the identity of the currently-serving network, to determine whether the terminal is currently served by its home network or by a different network.

It should be noted that, by itself, a simple indication of roaming vs. non-roaming (as in the Android OS) is insufficient for assessing the extra roaming cost, or even for deciding whether an extra cost exists. For example, roaming agreements between network operators may render a roaming network equivalent to the non-roaming network in terms of cost. The disclosed techniques, which assess the extra roaming cost based on actual usage patterns, provide a major enhancement in this respect.

In some embodiments, system 20 carries out the disclosed technique (assesses the roaming and non-roaming patterns, deduces the extra roaming cost, and decides whether and how to selectively enable data services) separately per network. Additionally or alternatively, system 20 may carry out a crowd-sourcing process that identifies cost-equivalent networks by considering multiple roaming and non-roaming patterns of a large number of terminals 24. This process is described in greater detail below.

Various techniques can be used for deducing or detecting the identity of the currently-serving network. In an example embodiment, agent 72 deduces the identity of the currently-serving network from the Internet Protocol (IP) address of the terminal. For example, agent 72 may establish a TCP/IP connection with some external server, e.g., with processor 52 of subsystem 40, and send one or more IP packets to the external server. The external server obtains the IP address of the terminal by extracting the source IP address of the packets received from the terminal. The translation from the IP address to the identity of the serving network may be performed in agent 72 or in the external server. In either case, agent 72 receives from the external server feedback that is indicative of the identity of the serving network.

Alternatively, agent 72 and/or subsystem 40 may check whether terminal 24 is roaming or not using any other suitable technique.

If terminal 24 is currently served by its home network, RCE 60 updates the non-roaming pattern of the terminal. If terminal 24 is currently served by a roaming network, RCE 60 updates the roaming pattern of the terminal. The method loops back to step 70 above. The process of FIG. 2 is typically carried out continuously per terminal 24.

In the present context, the term "pattern" (e.g., roaming pattern, non-roaming pattern) refers to any statistical information that is indicative of the manner in which user 28 uses data services. As noted above, the pattern is typically estimated based on usage of active data service, and not passive data services. The pattern is typically estimated by tracking past usage of data services by the user over a period of time. In various embodiments, each of the roaming and non-roaming patterns may comprise metrics such as:

- The accumulated length of time during which the user was connected and provided with data services by the network.
- The amount of data traffic exchanged between the terminal and the network.
- The amount of data traffic exchanged between the terminal and the network, normalized by the length of time the terminal was registered with the network.
- Any other suitable metric or combination of metrics.

In some embodiments, RCE 60 may use various techniques for assessing the extent of reduction in data-service usage between the non-roaming pattern and the roaming pattern, and for estimating the extra cost of roaming data services, or the impact of the extra cost on the user.

As noted above, in an embodiment, RCE 60 may measure the reduction in usage of data services on the roaming network relative to the non-roaming network. The RCE may then estimate the extra cost of data services on the roaming network to be monotonically-related to difference in usage of data services. In other words, a large drop in the usage of data services when roaming, relative to the home network, is indicative of a large extra cost, and vice versa.

In another embodiment, RCE 60 may measure the relative percentage of data-service activity of the terminal on the various networks, over a period of time. The relative percentage can be measured, for example, in time units or in data-size units. The RCE may estimate the extra cost of data services on the roaming network based on comparing the percentage of data-service activity on the roaming networks relative to the non-roaming networks.

In yet another embodiment, RCE 60 may calculate the percentage of time during which a network serving the terminal was identified as roaming. If this time percentage is high, i.e., if the terminal was found to be roaming for a large percentage of the time, the RCE may conclude that the home network of the terminal is an MVNO. Under this assumption, the RCE may estimate that the extra cost of data services on the roaming network is very low. For example, if the terminal is served by a roaming network during nearly 100% of the time, the RCE may estimate that the cost of data services is the same when roaming and when not roaming.

In still another embodiment, RCE 60 may estimate the extra cost of data services on the roaming network while considering the geographical location of the terminal. For example, if the terminal is located in an area associated with its home network, the RCE may assume that the extra cost of data services on the roaming network is low.

The RCE may reach a similar conclusion if the location of the terminal is identified as being in the vicinity of the user's home or work-place, or in an area that is very often frequented by the user. The RCE may obtain this information, for example, by analyzing the distribution of historical locations of the terminal. One parameter that can be used is the terminal's location as a function of the time-of-day. For example, it can generally be assumed that the usual overnight location of the user terminal corresponds to the user's home. Additionally or alternatively, RCE 60 may determine the home or work-place location based on how the user defined these locations in a navigation application such as Waze or Google Maps.

In some embodiments, RCE 60 may determine the geographic location of the terminal from Global Positioning System (GPS) data produced by a GPS device in the terminal. Alternatively, RCE 60 may determine the geographic location of the terminal based on the Service-Set Identifier (SSID) of a recent Wi-Fi connection of the terminal, i.e., based on the geographic location associated with this Wi-Fi SSID. Further alternatively, RCE 60 may determine the geographic location of the terminal based on the cell ID of a recent cellular connection of the terminal, i.e., based on the geographic location associated with this cell ID.

In some embodiments, RCE 60 may estimate the extra cost of data services on the roaming network by considering the Mobile Country Code (MCC) value of the terminal's home network (as defined in the SIM) and the MCC value of the currently serving network. If the two MCC values indicate the same country, the extra cost of data services on the roaming network might be assumed relatively low. If the two MCC values indicate different countries, the extra cost of data services on the roaming network might be assumed higher. If the two MCC values indicate countries that are far away from one another, the extra cost of data services might be assumed higher than for neighboring countries. These indicators, however, are not guaranteed. In some embodiments RCE 60 may prefer to use them only in combination with other indicators, to reach an overall reliable estimate of the extra cost of roaming.

In some embodiments, RCE 60 may use a crowd-sourcing scheme that estimates the extra cost of data services on the roaming network, for a given terminal 24, based on the statistical correlation between the home network and the currently-serving network over many terminals and over a long time period. Consider, for example, a given terminal whose home network is X and is currently roaming in network Y. If RCE 60 identifies that it is very common to find terminals 24 of home network X roaming on network Y, RCE 60 may estimate a low roaming cost for the given terminal. If, on the other hand, RCE 60 finds that terminals 24 of home network X very rarely roam on network Y, the RCE may estimate a high roaming cost. The RCE may establish the correlation between a home network and a roaming network, for example, by correlating the Mobile Country Code (MCC) and Mobile Network Code (MNC)

values of the home network and the currently serving network over many terminals, and/or over a long time period.

The indicators described above are given purely by way of example. Any other suitable indicator, and/or combination of indicators, may also be used. For example, the extra roaming cost may be considered low only if the MCC indicates the terminal is in its home country and the reduction in data service usage for the roaming network is small.

As noted above, the functionality of RCE 60 may be implemented on the network side, as in the example of FIG. 1, or in terminal 24, e.g., in agent 72.

FIG. 3 is a flow chart that schematically illustrates a method for selective enabling of data services to user terminal 24, in accordance with an embodiment of the present invention. The method begins with CPC 56 and/or agent 72 receiving a request to use a data service, e.g., prefetch, by terminal 24, at a data requesting step 90.

At a comparison step 94, RCE 60 estimates a measure of reduction in data-service usage between the non-roaming pattern and the roaming pattern. At a cost estimation step 98, RCE 60 estimates the extra cost of roaming, or the impact of the extra cost on user 28, and passes the estimation results to CPC 56.

At a cost checking step 102, CPC 56 checks whether the extra cost, or the impact of the extra cost on user 28, is sufficiently low, e.g., below a predefined threshold. If the extra cost or impact of the cost is sufficiently low, CPC 56 permits a higher extent of usage of data services to terminal 24, at an enabling step 106. If the extra cost or impact of the cost is too high, CPC 56 permits a lesser extent of usage of data services, at a denial step 110.

In some embodiments, the decision whether to reduce data-service usage is taken by agent 72 in terminal 24, based on information provided by subsystem 40. This partitioning is sometimes advantageous, for example because CPC 56 may not be aware of which network is currently serving the terminal. Subsystem 40 may provide agent 72 with various types of information in order to make this decision. In one embodiment, CPC 56 sends to agent 72 a "roaming importance rating" per network. This rating is described in detail below. Agent 72 may use these ratings, possibly in combination with some predefined prefetching policy, to selectively enable prefetching on the currently-serving network. Alternatively, CPC 56 may compute a suitable metric or threshold, e.g., based on the roaming importance rating, and report only the threshold or metric to agent 72. Further alternatively, any other partitioning or interface between CPC 56 and agent 72 in terminal 24 can be used.

Agent 72 may use any suitable technique for controlling the extent of prefetching (or usage of any other data service) based on the information provided by CPC 56 (e.g., based on the roaming importance rating or extra roaming cost). In one example embodiment, agent 72 controls the extent of prefetching by varying the maximum cache size (in cache 68) that is available for caching prefetched content. Increasing the maximum allowed size of cache 68 will in turn increase the extent of prefetching, and vice versa.

In some embodiments, RCE 60 takes into account the relative importance of a particular data service to user 28 when estimating the extra cost of the data service on a roaming network. This relative importance measure is referred to herein as the "roaming importance rating" of the data service. In some embodiments, user 28 may specify the roaming importance rating for the data service explicitly. For example, user 28 may specify a rating between 0 and 1 for a prefetch operation during roaming. The specified rating indicates how much prefetch activity should be scaled down during roaming. In some embodiments, the rating is specified separately for each network identified as roaming. Furthermore, a single rating can be used for all data services or can be specified separately per data service.

In some embodiments, RCE 60 may use the "roaming importance rating" in addition to comparing the terminal's roaming and non-roaming data-service usage patterns. In other embodiments, the RCE may use the roaming importance rating instead of comparing the patterns. In the latter embodiments, the extra cost of data services on the roaming network is assumed to increase as the roaming importance rating decreases.

In some embodiments, RCE 60 may estimate the roaming importance rating automatically based on analyzing usage activity or performance of a particular data service. For example, RCE 60 may assign a high roaming importance rating to a data service that is frequently actively used or that achieves high performance, and vice versa. For a prefetching service, for example, if the estimated performance gain (e.g., latency reduction) of the prefetching service is expected to be large, RCE 60 may increase the roaming importance rating of the prefetching service, and vice versa.

In some embodiments the roaming importance rating is used directly by CPC 56 in setting the prefetching policy on the roaming network, without processing by RCE 60. For example, for a network that is assigned a prefetch roaming importance rating of zero, CPC 56 may stop all prefetching activity on that network. For a network assigned a rating of 1, CPC 56 may carry out prefetching operations as if connected to a non-roaming network.

In some embodiments, subsystem 40 specifies for terminal 24 a target prefetch ratio, defined as the percentage of prefetch data traffic relative to the total non-prefetch data traffic. RCE 60 can adjust the estimated extra cost of prefetching on the roaming network based on this ratio. Subsystem 40 may specify the target prefetch ratio for all roaming networks, and specify a separate target prefetch ratio for the non-roaming network. In other embodiments, subsystem 40 may specify a target ratio independently for each roaming network. Using this mechanism, the extent of prefetching operations (e.g., the volume of prefetched data) will vary based on the extent of total non-prefetch operations (e.g., the volume of non-prefetched data). Such a mechanism is further addressed in U.S. Provisional Patent Application 62/274,319, cited above.

In some embodiments, subsystem 40 adapts the target prefetch ratio automatically, based on the extra cost of data-service usage, as estimated by RCE 60. Again, this adaptive setting may be performed globally for all roaming networks, or individually per roaming network. In other embodiments, subsystem 40 sets the target prefetch ratio directly, based on the estimated reduction in data-service usage between the non-roaming and roaming networks.

In some embodiments, subsystem 40 may decide to increase the amount of prefetching, or the maximum prefetch cache size, based on a prediction that the terminal is expected to operate on a roaming network characterized by high data roaming cost. For example, subsystem 40 may boost prefetching activity in advance, while the terminal is still served by the home network, e.g., by increasing the prefetch cache size.

In some embodiments, CPC 56 uses the target prefetch ratios directly in setting the prefetching policy. For example, if the prefetch traffic volume on a particular network is restricted to be less than 10% of the non-prefetch traffic volume on that network, this should guarantee that prefetch roaming costs will not exceed 10% of the total non-prefetch roaming costs.

As noted above, although the embodiments described herein refer mainly to prefetching, the disclosed techniques can be used for selected enabling of various other data services. Example data services comprise cloud backup, as well as background updates in navigation applications, social-network applications and content sharing and archiving applications. In a cloud backup service, for example, system 20 may temporarily postpone backup on a roaming network, when the estimated roaming cost is high. A time limit may be imposed on this postponement, so as not to risk backup protection.

In a navigation application, system 20 may temporarily postpone or reduce the frequency of downlink updates (e.g., traffic conditions) and/or uplink updates (e.g., reports from users) on a roaming network, if the estimated roaming cost is high. In a social-network application, system 20 may postpone or reduce the frequency of updates of the user's feed on a roaming network, if the estimated roaming cost is high. Similar functionality can be applied to updates of content-sharing and archiving applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a network interface; and
one or more processors, which are configured to:
track a non-roaming usage pattern, which characterizes a manner in which a user terminal consumes one or more data services while served by a home network specified for the user terminal;
track a roaming usage pattern, which characterizes the manner in which the user terminal consumes the one or more data services while served by one or more networks other than the home network;
estimate a reduction in usage of the one or more data services between the non-roaming and roaming usage patterns; and
selectively enable a data service to the user terminal by the networks other than the home network, based on the estimated reduction in usage.

2. The system according to claim 1, wherein the processors are configured to track the non-roaming and roaming usage patterns and estimate the reduction in usage with respect to one or more active data services, and to selectively enable a passive data service.

3. The system according to claim 1, wherein the processors are configured to selectively enable prefetching of content to the user terminal.

4. The system according to claim 1, wherein the processors are configured to permit exchange of up to a first data volume in response to a first reduction in usage, and to permit exchange of up to a second data volume, larger than the first data volume, in response to a second reduction in usage that is smaller than the first reduction in usage.

5. The system according to claim 1, wherein the processors are configured to deny the data service in response to a first reduction in usage, and to permit the data service in response to a second reduction in usage that is smaller than the first reduction in usage.

6. The system according to claim 1, wherein the processors are configured to track the non-roaming and roaming usage patterns by tracking one or more of:
first and second time durations spent in consuming the one or more data services on the home network and on the networks other than the home network, respectively;
first and second data volumes exchanged in consuming the one or more data services on the home network and on the networks other than the home network, respectively; and
first and second data volumes exchanged in consuming the one or more data services on the home network and on the networks other than the home network, normalized by first and second registration durations on the home network and on the networks other than the home network, respectively.

7. The system according to claim 1, wherein the processors are configured to selectively enable the data service by:
deriving, from the estimated reduction in usage, an extra cost of consuming the one or more data services by the user terminal when served by the networks other than the home network, relative to the home network; and
selectively enabling the data service depending on the extra cost.

8. The system according to claim 7, wherein the processors are configured to assess the extra cost as a function of a geographical location of the user terminal.

9. The system according to claim 7, wherein the processors are configured to derive the extra cost for a given roaming network by assessing, over a plurality of other user terminals having the same home network as the user terminal, a prevalence of consuming the data service on the given roaming network.

10. The system according to claim 7, wherein the processors are configured to adjust an estimate of the extra cost based on a target ratio between usage of prefetched data and usage of non-prefetched data.

11. The system according to claim 1, wherein the processors are configured to set, based on the reduction in usage, a target ratio between usage of prefetched data and usage of non-prefetched data.

12. The system according to claim 1, wherein the processors are configured to selectively enable the data service based on an assessed level of importance of the data service to a user of the user terminal when roaming.

13. The system according to claim 1, wherein the processors are configured to estimate the reduction in usage, and selectively enable the data service, separately for first and second networks other than the home network.

14. A method, comprising:
tracking a non-roaming usage pattern, which characterizes a manner in which a user terminal consumes one or more data services while served by a home network specified for the user terminal;

tracking a roaming usage pattern, which characterizes the manner in which the user terminal consumes the data services while served by one or more networks other than the home network;

estimating a reduction in usage of the one or more data services between the non-roaming and roaming usage patterns; and selectively enabling a data service to the user terminal by the networks other than the home network, based on the estimated reduction in usage.

15. The method according to claim 14, wherein tracking the non-roaming and roaming usage patterns and estimating the reduction in usage are performed with respect to one or more active data services, and wherein selectively enabling the data service is applied to a passive data service.

16. The method according to claim 14, wherein selectively enabling the data service comprises selectively enabling prefetching of content to the user terminal.

17. The method according to claim 14, wherein selectively enabling the data service comprises permitting exchange of up to a first data volume in response to a first reduction in usage, and permitting exchange of up to a second data volume, larger than the first data volume, in response to a second reduction in usage that is smaller than the first reduction in usage.

18. The method according to claim 14, wherein selectively enabling the data service comprises denying the data service in response to a first reduction in usage, and permitting the data service in response to a second reduction in usage that is smaller than the first reduction in usage.

19. The method according to claim 14, wherein tracking the non-roaming and roaming usage patterns comprises tracking one or more of:

first and second time durations spent in consuming the one or more data services on the home network and on the networks other than the home network, respectively;

first and second data volumes exchanged in consuming the one or more data services on the home network and on the networks other than the home network, respectively; and first and second data volumes exchanged in consuming the one or more data services on the home network and on the networks other than the home network, normalized by first and second registration durations on the home network and on the networks other than the home network, respectively.

20. The method according to claim 14, wherein selectively enabling the data service comprises:

deriving, from the estimated reduction in usage, an extra cost of consuming the one or more data services by the user terminal when served by the networks other than the home network, relative to the home network; and selectively enabling the data service depending on the extra cost.

21. The method according to claim 20, wherein deriving the extra cost comprises assessing the extra cost as a function of a geographical location of the user terminal.

22. The method according to claim 20, wherein deriving the extra cost for a given roaming network comprises assessing, over a plurality of other user terminals having the same home network as the user terminal, a prevalence of consuming the data service on the given roaming network.

23. The method according to claim 20, wherein deriving the extra cost comprises adjusting an estimate of the extra cost based on a target ratio between usage of prefetched data and usage of non-prefetched data.

24. The method according to claim 14, wherein selectively enabling the data service comprises setting, based on the reduction in usage, a target ratio between usage of prefetched data and usage of non-prefetched data.

25. The method according to claim 14, wherein selectively enabling the data service comprises enabling the data service based on an assessed level of importance of the data service to a user of the user terminal when roaming.

26. The method according to claim 14, wherein estimating the reduction in usage, and selectively enabling the data service, are performed separately for first and second networks other than the home network.

* * * * *